Patented Sept. 7, 1954

2,688,530

UNITED STATES PATENT OFFICE 2,688,530

METHOD OF PREPARING URANIUM TETRACHLORIDE

Edward L. Wagner, Providence, R. I., and Burnett M. Pitt, Evanston, Ill., assignors, by mesne assignments, to the United States of America as represented by the United States Atomic Energy Commission No Drawing. Application June 9, 1949,
Serial No. 98,164

11 Claims. (Cl. 23—14.5)

This invention relates to the preparation of metal chlorides and is particularly concerned with the production of uranium tetrachloride.

The methods heretofore employed for preparing uranium tetrachloride from compounds containing hexavalent uranium, such as uranium trioxide, have required a vapor phase reaction to obtain a reasonable yield of pure compound. Prior to this invention the most effective vapor-phase chlorinating agent has been carbon tetrachloride. As is typical of vapor phase reactions the process requires relatively expensive equipment. Moreover, in order to obtain the product in a reasonable amount of time in the reaction with carbon tetrachloride, it is necessary to employ relatively high temperatures, that is, of the order of 450° C. At this temperature considerable quantities of the uranium compound are converted not to the tetrachloride but to the pentachloride. The pentachloride is relatively volatile and as a result there is danger of losing the relatively valuable uranium. Moreover, the reaction products include relatively large quantities of phosgene and its decomposition products with their attendant difficulties in handling and danger to operating personnel. In general, liquid phase reactions do not result in the formation of appreciable quantities of uranium tetrachloride. For example, in the reaction between hydrogen chloride and uranium trioxide uranyl chloride is produced. It therefore becomes desirable that a method be found for producing uranium tetrachloride from compounds containing hexavalent uranium by a liquid phase reaction at a relatively low temperature.

Accordingly, one object of this invention is to provide an improved method of preparing metal chlorides.

Another object of the invention is to provide an improved method of preparing uranium tetrachloride from compounds containing hexavalent uranium by a liquid phase reaction.

A further object is to provide a low-temperature method of preparing uranium tetrachloride with a high yield.

A still further object is to provide a relatively economical method of preparing uranium tetrachloride.

Other objects will be in part obvious and in part pointed out hereinafter.

In its broadest concept the present invention comprises reacting a uranium compound containing hexavalent uranium with liquid hexachlorpropylene at an elevated temperature. The reaction takes place easily at temperatures below the boiling point of hexachlorpropylene (210° C.) at atmospheric pressure. The compounds which may be employed in this reaction are in general any uranium compound other than phosphate or fluorine-containing compounds and in which at least 50 mol per cent of the uranium is hexavalent.

Three procedures have been found satisfactory for carrying out this reaction. In one the uranium compound and the hexachlorpropylene are placed together in a reactor whose temperature may be regulated and which is fitted with a reflux condenser. When the two compounds are heated together, uranium tetrachloride is produced, the reaction products remaining in the reaction mixture. In another method the reactants are heated together while the by-products of the reaction are distilled continuously from the reaction mixture.

Instead of using either of the methods just described one of the compounds may be added to the other at a desired rate in a heated reaction vessel maintained at the desired temperature. This may be carried out under conditions of reflux or under conditions where the by-products are continuously distilled from the reaction mixture. The preferred method is to add the uranium compound to the hexachlorpropylene since this makes possible a very precise control over the reaction rate.

The product uranium tetrachloride may be purified by any suitable method. However, one preferred procedure comprises separating the uranium tetrachloride by filtration, washing it with carbon tetrachloride and thereafter drying the uranium tetrachloride, for example, by passing a current of hot air over the compound. The carbon tetrachloride may be easily recovered and purified for re-use. An alternative procedure consists essentially in heating the reaction mixture at a temperature in the range of 400 to 500° C. in an inert atmosphere to remove any excess hexachlorpropylene and also the reaction by-products.

The following examples are presented to illustrate the method of the present invention with the understanding that the invention is not intended to be limited to the specific details disclosed.

EXAMPLE 1

Approximately 1200 grams of uranium-6 peroxide hydrate ($UO_4 \cdot 2H_2O$) were dissolved in a liter of concentrated hydrochloric acid. The mixture was evaporated until its temperature reached 150° C. The material precipitating from the solution was analyzed and contained 65.6% uranium and 17.9% chlorine corresponding to the formula $UO_2Cl \cdot H_2O$. This solid was mixed with 3100 milliliters of hexachlorpropylene and the mixture heated in a beaker for 2 hours at 180 to 190° C. The product was separated by filtration and washed with carbon tetrachloride. It was dried by heating at 300 to 350° C. for 30 minutes at a pressure of 5–15 millimeters of mercury absolute. The product contained 62.6% uranium and 39.6% chlorine and had a ratio of chlorine to uranium atoms of 3.96.

EXAMPLE 2

A sample of ammonium diuranate was prepared by reacting a solution of uranyl nitrate with excess ammonia. The solid precipitate was filtered from the solution and calcined to constant weight at a temperature of about 350 to 380° C. The resulting orange-colored compound, after cooling, was mixed with liquid hexachlorpropylene in a flask fitted with a reflux condenser and a stirrer. The mixture was heated until the escape of gases indicated that a reaction was occurring. Since the reaction is exothermic, it was allowed to proceed without heating. After the reaction subsided, heat was again applied to the flask until the temperature of the reaction mixture reached 190° C. The reaction mixture was then cooled to room temperature and the uranium tetachloride product removed by filtration. It was dried as described in Example 1. The product contained 62.6% uranium and 37.3% chlorine with a ratio of chlorine to uranium atoms of 4.00.

EXAMPLE 3

A solution of uranyl nitrate hexahydrate was evaporated until the temperature of the solution reached 120° C. The solution was then cooled and added dropwise to liquid hexachlorpropylene maintained at a temperature of 190° C. After the addition was complete, the mixture was heated at a temperature between 190 and 205° C. for 1 hour. The product of this reaction was uranium tetrachloride containing 63.1% uranium and 36.3% chlorine, the ratio of chlorine to uranium being 4.08. The sum of the uranium and chlorine in the compound was 99.4% by weight. In a similar experiment where the temperature of the hexachlorpropylene was 175° C. during the addition of the uranyl nitrate, the product contained 61.8% uranium and 36.8% chlorine. The ratio of chlorine to uranium in this compound was 3.97 and the compound was 98.4% pure.

EXAMPLE 4

A number of samples of uranyl nitrate hexahydrate were calcined to uranium trioxide. After the solid had cooled to about 100° C. three liters of hexachlorpropylene were added to it. The reaction mixture was stirred and heated to about 110° C. where the reaction took place with the temperature rising quickly to 165 to 170° C. without further application of heat. After the initial reaction had subsided, the temperature of the reaction mixture was maintained at 175° C. for about 1 hour. The products were cooled to room temperature and the solid separated and purified as described in Example 1. The results of these reactions are shown in Table 1.

*Table 1*

| U Charged, g | 501.9 | 553.5 | 1,088.0 | 482.9 | 396.5 |
|---|---|---|---|---|---|
| U Recovered as $UCl_4$, g | 480.7 | 523.1 | 991.0 | 440.3 | 393.8 |
| U, Percent | 61.7 | 62.4 | 62.2 | 61.9 | 61.9 |
| Cl, Percent | 37.0 | 37.0 | 36.9 | 37.2 | 36.8 |
| Ratio Cl:U | 4.02 | 3.97 | 3.98 | 4.04 | 3.97 |
| U+Cl, Percent | 98.7 | 99.4 | 99.1 | 99.1 | 98.7 |
| Conversion to $UCl_4$, Percent | 95.8 | 94.6 | 91.2 | 91.2 | 99.5 |
| Total Recovery, Percent | 99.6 | 99.9 | 99.6 | 100.1 | 99.8 |

Of the many compounds which may be used, uranium trioxide is preferred in this reaction. In the reaction between uranium trioxide and liquid hexachlorpropylene, it is desirable to employ at least 4.27 grams of hexachlorpropylene per gram of uranium trioxide, that is a molar ratio of about 5:1, and the temperature at which the reaction is carried out is preferably in excess of 150° C. since below this temperature the purity of the compound is appreciably affected as is indicated in Table 2. The results of Table 2 were obtained by heating 33.3 grams of uranium trioxide with 100 milliliters of hexachlorpropylene for 1 hour under a reflux condenser.

*Table 2*

PRODUCT ANALYSIS

| Temp. (° C.) | Percent U+Cl | Percent $U^{vi}$ | Cl/U |
|---|---|---|---|
| 100 | 77.5 | 46.5 | 2.09 |
| 125 | 97.7 | 8.2 | 3.92 |
| 150 | 99.4 | 3.4 | 4.00 |
| 160 | 99.7 | 0.2 | 3.99 |

Better results are obtained at temperatures below 150° C. when uranium trioxide is added slowly to the hexachlorpropylene over a period of about an hour followed by heating the two together for 15 to 30 minutes. However, these times are not critical.

The reaction has been described with reference to only a few compounds containing hexavalent uranium. Others of this general class may be used alternatively, for example, $U_3O_8$ (uranous uranic oxide), a prepared mixture of uranium dioxide and uranium trioxide containing twice as much of the latter, $UO_4 \cdot 2H_2O$, calcined $(NH_4)_2U_2O_7$ (ammonium diuranate), uranyl sulfate and other uranyl salts with the exception of the fluoride and phosphate. Uranium dioxide does not enter the reaction to any practical extent, and fluorine or phosphate containing compounds yield only tetravalent fluoride or phosphate salts.

In each of the compounds which may be used efficaciously, a substantial part of the uranium is hexavalent. It has been found that at least 50 mol per cent of the uranium should be in the hexavalent state to obtain a satisfactory yield of uranium tetrachloride. The uranium compound may be in solution or may be hydrated or anhydrous. The compounds of uranium which have been utilized most effectively in accordance with this invention were those of the class consisting of the oxides of uranium wherein at least 50 mol per cent of the uranium is hexavalent, ammonium diuranate and inorganic uranyl salts other than the fluoride and phosphate.

It will now be evident that the present invention is very effective for producing large quantities of uranium tetrachloride of high purity. The economies of this process are manifest—relatively low operating temperatures, an easily controllable reaction, a high yield and the possibility of using relatively simple equipment. It is to be noted particularly that virtually none of the uranium is converted to chlorides other than the tetrachloride. This eliminates any need for a reduction step and simplifies markedly the purification of the compound.

The reaction is in itself unusual since not only is there a replacement by chlorine in the uranium compound but the uranium itself is reduced. The principal reaction product other than the uranium tetrachloride is trichloracrylyl chloride. This would seem to indicate that the double bond of the hexachlorpropylene is not attacked to any appreciable extent and that hexachlorpropylene, although an active chlorinating agent in this reaction, is at the same time an active reducing agent.

Many embodiments of the present invention might be made by those skilled in the art and many alternatives will be suggested by the foregoing description. It is to be understood, however, that this description is only illustrative and that the invention is limited only by the appended claims.

We claim:

1. The process of producing uranium tetrachloride which comprises heating hexachlorpropylene at a temperature below its boiling point in liquid phase contact with a compound selected from the group consisting of the oxides of uranium wherein at least 50 mol per cent of the uranium is hexavalent and uranyl salts while maintaining the reaction mixture substantially free from fluoride and phosphate ions.

2. The process of producing uranium tetrachloride which comprises heating hexachlorpropylene at a temperature below its boiling point in liquid phase contact with an oxide of uranium wherein at least 50 mol per cent of the uranium is hexavalent.

3. The process of producing uranium tetrachloride which comprises heating hexachlorpropylene at a temperature below its boiling point in liquid phase contact with a uranyl salt while maintaining the reaction mixture substantially free from fluoride and phosphate ions.

4. The process of producing uranium tetrachloride which comprises heating hexachlorpropylene at a temperature below its boiling point in liquid phase contact with uranium trioxide.

5. The process of producing uranium tetrachloride which comprises heating hexachlorpropylene at a temperature below its boiling point in liquid phase contact with uranium tetroxide.

6. The process of producing uranium tetrachloride which comprises heating hexachlorpropylene at a temperature below its boiling point in liquid phase contact with uranous uranic oxide.

7. The process of producing uranium tetrachloride which comprises heating hexachlorpropylene at an elevated temperature below its boiling point in liquid phase contact with a compound selected from the group consisting of the oxides of uranium wherein at least 50 mol per cent of uranium is hexavalent and inorganic uranyl salts while maintaining the reaction mixture substantially free from fluoride and phosphate ions.

8. The process of producing uranium tetrachloride which comprises heating hexachlorpropylene at an elevated temperature below its boiling point in liquid phase contact with an oxide of uranium wherein at least 50 mol per cent of the uranium is hexavalent.

9. The process of producing uranium tetrachloride which comprises heating hexachlorpropylene at an elevated temperature below its boiling point in liquid phase contact with uranium trioxide.

10. The process of producing uranium tetrachloride which comprises heating hexachlorpropylene at a temperature below its boiling point in liquid phase contact with uranium trioxide, the reaction mixture containing at least 5 mols of hexachlorpropylene for each mol of uranium trioxide.

11. The method of producing uranium tetrachloride which comprises heating hexachlorpropylene at a temperature below its boiling point in liquid phase contact with an oxide of uranium containing at least 50 mol per cent of the uranium in the hexavalent state to produce uranium tetrachloride, separating the uranium tetrachloride and thereafter washing the uranium tetrachloride with carbon tetrachloride.

References Cited in the file of this patent

Friend, Textbook of Inorganic Chemistry, vol. 7, part 3, p. 294, (1926). Published by Charles Griffin and Co., Ltd., London.

Mellor, Comprehensive Treatise of Inorganic and Theoretical Chemistry, volume 12, pages 80, 83 (1932). Published by Longmans, Green and Company, London.